(12) United States Patent
Kim et al.

(10) Patent No.: US 6,978,058 B2
(45) Date of Patent: Dec. 20, 2005

(54) MULTI-LAYER PCB AND METHOD FOR COUPLING BLOCK TYPE MULTICHANNEL OPTICAL SIGNALS

(75) Inventors: Young-Woo Kim, Chungchungnam-do (KR); Byoung-Ho Rhee, Daejeon (KR); Dek-Gin Yang, Chungchungbuk-do (KR); Young-Sang Cho, Chungju-si (KR); Kyu-Hyok Yim, Chungchungbuk-do (KR)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 336 days.

(21) Appl. No.: 10/414,921

(22) Filed: Apr. 16, 2003

(65) Prior Publication Data

US 2004/0109627 A1 Jun. 10, 2004

(30) Foreign Application Priority Data

Dec. 5, 2002 (KR) .................................. 10-2002-0077083

(51) Int. Cl.[7] ................................................. G02B 6/12
(52) U.S. Cl. ............................. 385/14; 385/53; 385/88; 385/129; 385/130; 385/131
(58) Field of Search ............................. 385/14, 15, 53, 385/88, 129–131

(56) References Cited

U.S. PATENT DOCUMENTS 5,652,811 A * 7/1997 Cook et al. .................... 385/14

6,257,771 B1 * 7/2001 Okayasu ........................ 385/89
6,516,105 B1 * 2/2003 Khusid et al. .................. 385/15

FOREIGN PATENT DOCUMENTS

JP 2001-113289 7/2001

* cited by examiner

Primary Examiner—Brian Healy
Assistant Examiner—Eric Wong
(74) Attorney, Agent, or Firm—Gottlieb, Rackman & Reisman, P.C.

(57) ABSTRACT

The present invention discloses a multi-layer Printed Circuit Board (PCB) and method for coupling block type multichannel optical signals, the method including the steps of i) forming one or more first optical via holes to allow one or more first optical signal coupling blocks to be inserted therein, ii) aligning a first optical waveguide and the first optical signal coupling blocks so that the first optical waveguide is interconnected to the first optical signal coupling blocks via an optical signal, iii) attaching a first fixing guide to a base board to fasten the first optical signal coupling blocks, iv) removing the first fixing guide and forming one or more second optical via holes to allow one or more second optical signal coupling blocks to be inserted therein, and v) repeatedly performing steps i) to iv) as many times as a number of layers of the multi-layer PCB.

44 Claims, 19 Drawing Sheets

MULTI-LAYER PCB AND METHOD FOR COUPLING BLOCK TYPE MULTICHANNEL OPTICAL SIGNALS

BACKGROUND OF THE INVENTION

1. Field of the Invention

The present invention relates generally to a multi-layer printed circuit board and method for coupling block type multichannel optical signals, and more particularly to a multi-layer printed circuit board and method for coupling block type multichannel optical signals, in which a plurality of optical via holes are formed in a multi-layer base board, fiber or pipe blocks are simultaneously or sequentially inserted into the optical via holes through the use of fixing guides, and optical waveguides and optical fibers are interconnected to one another between layers, thereby forming N×N block type multichannel optical waveguides in multiple layers instead of conventional 1×N block type multichannel optical waveguides.

2. Description of the Prior Art

Generally, a Printed Circuit Board (PCB) is a circuit board fabricated by densely mounting a plurality of components on a plate made of phenol resin or epoxy resin and densely forming curtailed circuits on the surface of the plate to connect the respective components to each other. Such a PCB is manufactured by placing a conductive film, such as a copper film, on one surface of a phenol or epoxy resin insulation plate, forming circuit patterns through (whereby the copper film is then corroded away except for the line-shaped circuits), and forming holes to allow electrical components to be mounted on the insulating plate.

PCBs are classified into single-sided PCBS, double-sided PCBs and multi-layer PCBs according to the number of circuit pattern surfaces. As the number of layers of a PCB increases, the capacity to mount components thereon increases greatly, so PCBs having many layers are applied to high precision products. A multi-layer PCB designates a PCB having three or more layers including a surface conductive pattern. The conductive patterns are formed on the respective layers of the PCB while being separated from each other by insulation materials provided between the respective layers.

On the other hand, in the prior art, circuit patterns are formed on a copper plate (through a patterning process) at the time of manufacturing a PCB to form inner and outer layers of the PCB. Recently, one or more optical waveguides capable of transmitting and receiving signals via light through the use of polymer materials and glass fibers are inserted into a PCB, which is called an Electro-Optical Circuit Board (EOCB). Such an EOCB is a PCB in which one or more optical waveguides and one or more glass plates are inserted into a base board on which copper circuit patterns are formed, so electrical and optical signals are used together, thus performing super-high speed data communication in the same board through optical signal interfacing, and converting the optical signals into electrical signals in each mounted device so as to store data and process signals.

Currently, several coupling methods have been proposed for coupling optical signals between respective layers of a multi-layer PCB. Generally, a direct writing method, a beam reflection method, a method using a reflection mirror, and a direct coupling method are employed as methods of coupling optical signals between multi-channel layers.

Hereinafter, an example of an optical interface in conventional PCB is described with reference to FIG. 1.

FIG. 1 shows a conventional beam coupling technology using a beam reflecting micro mirror.

Referring to FIG. 1, if an electrical signal is input from a processor board 2, the electrical signal is converted into an optical signal by a laser diode 1 in a transmission module 3 mounted on a PCB, and the optical signal is radiated. Thereafter, the radiated optical signal passes through lenses 8a and 8b on the left side of FIG. 1 and is reflected by a micro mirror 4a inserted into the PCB and depicted on the right side of FIG. 1. The reflected optical signal passes through an optical waveguide and is then reflected by a reflection mirror 4b on the right side of FIG. 1. Thereafter, the reflected optical signal is transmitted to a photodiode 6 in a reception module 7 through lenses 8c and 8d on the left side of FIG. 1. In the optical waveguide, the optical signal is transferred through its multi-mode polymer cores 5a and 5b with low loss. A waveguide cladding 9 is formed above and under the cores 5a and 5b. Consequently, an electrical signal transmitted from the processor board 2 on the left side of FIG. 1 is converted into an optical signal and transmitted. Thereafter, the optical signal is again converted into an electrical signal and then transmitted to a processor board on the left side of FIG. 1.

A conventional multi-layer PCB for coupling optical signals is described with reference to FIGS. 2a and 2b.

FIGS. 2a and 2b are front and side sectional views of the conventional multi-layer PCB for coupling optical signals, respectively. Referring to FIGS. 2a and 2b, the conventional multi-layer PCB employs a manner in which, if light is emitted from each Vertical-Cavity Surface-Emitting Laser (VCSEL) 13, that is, a light source device, a micro lens 17 concentrates the light and transmits the concentrated light to an optical waveguide 14 and 15 through PCB optical via holes 16. At this time, signal coupling between respective layers is performed in the same manner as described above. In this case, a Silicon Optical Bench (SiOB) 12 is formed on a PCB 11, wherein the SiOB is a term generally designating silicon wafers. Instead of the SiOB 12, a polymer board can be used. The optical waveguide typically includes a cladding 14 and a core 15, and functions to transfer light received from the VCSEL 13 through the micro lens 17. Thereafter, an optical signal 19 is transferred to an optical waveguide of another layer. In this case, each of the optical via holes 16 is insulated with an insulation material 18. Further, a micro lens 17' can be inserted into each of the optical via holes 16 so as to more reliably transmit the optical signal.

The VCSEL 13 designates a light source used in an optical module that transmits and amplifies optical source data using a manner in which circular laser beams are emitted perpendicularly to the surface of a board. So far Light Emitting Diodes (LEDs) and edge emitting Laser Diodes (LDs) have been generally used. However, Surface-Emitting Lasers (SELs) developed in the 1990s have been gaining popularity as light sources, replacing LEDs and edge emitting LDs. Such VCSELs are used in optical fiber communications, interfacing, large capacity information parallel processing, etc.

However, the conventional multi-layer PCB using the optical via holes 16 to transmit the optical signal 19 is problematic in that the micro lens 17 must be used, and the wavelength of an optical signal that can be transmitted through the conventional multi-layer PCB is limited to 200 µm. Additionally, a technique for inserting optical waveguides into the multiple layers of a multi-layer PCB has not been disclosed.

Further, in the prior art, many coupling methods for waveguides using curved surface reflection mirrors or prisms have been proposed. However, theses coupling methods are problematic in that it is difficult to insert reflection mirrors or prisms into base boards and attach the mirrors or prisms to the base boards, and alignment errors may occur between the reflection mirrors or prisms and the base boards when respective layers are processed in a single line using several mechanical drills to couple multi-channel signals in cases where a multi-layer PCB is manufactured.

SUMMARY OF THE INVENTION

Accordingly, the present invention has been made keeping in mind the above problems occurring in the prior art, and an object of the present invention is to provide a multi-layer PCB and method for coupling block type multichannel optical signals, which is capable of simultaneously or sequentially forming N×N block type multichannel optical waveguides in the multiple layers of a multi-layer PCB.

Another object of the present invention is to provide a multi-layer PCB and method, which is capable of improving the alignment characteristics of the multi-layer PCB through the use of fixing guides.

Another object of the present invention is to provide a multi-layer PCB and method, which is capable of receiving and transmitting broadband data through the use of a single PCB by coupling multichannel optical signals across multiple layers and employing a N×N block type VCSEL array.

Another object of the present invention is to provide a multi-layer PCB and method, which is capable of preventing physical stress in a manufacturing process by inserting optical waveguides and packaging a multi-layer PCB body within a packaging frame.

In order to accomplish the above objects, the present invention provides a method of coupling block type multichannel optical signals in a multi-layer Printed Circuit Board (PCB), comprising the steps of i) forming one or more first optical via holes to allow one or more first optical signal coupling blocks to be inserted therein; ii) aligning a first optical waveguide and the first optical signal coupling blocks so that the first optical waveguide is interconnected to the first optical signal coupling blocks via an optical signal; iii) attaching a first fixing guide to a base board to fasten the first optical signal coupling blocks; iv) removing the first fixing guide and forming one or more second optical via holes to allow one or more second optical signal coupling blocks to be inserted therein; and v) repeatedly performing steps i) to iv) as many times as the number of layers of the multi-layer PCB; wherein the last fixing guide is attached to and maintained in the base board.

Preferably, the method further may comprise vi) forming a packaging frame enclosing a multi-layer base board for reducing the physical stress when the multi-layer PCB is constructed in multiple layers; and vii) interconnecting the multi-layered structure formed by connecting said optical signal blocks and optical waveguides, to said packaging frame.

Preferably, the packaging frame may be made of low flow prepreg and an unclad Copper Clad Laminate (CCL).

Preferably, the method may further comprise the step of placing a layer in which an electric circuit is formed, either to be closed so as to cover the packaging frame, or to be opened so as to uncover the packaging frame.

Preferably, the fixing guide may be provided with windows that have sizes corresponding to those of the optical signal coupling blocks and are formed at positions corresponding to those of the optical via holes, and be made of a silicon board or polymer material.

Preferably, each of the optical signal coupling blocks may be a fiber block in which a plurality of optical signal coupling members are inserted into a lower block provided with grooves each having a certain shape, the certain shape may be a "V" shape, and the grooves each having the certain shape may be formed by laser ion etching.

Preferably, the optical signal coupling members may be plastic optical fibers or optical waveguides, and may be cut at an angle of either 45° or 90° to be interconnected to the optical waveguides in an "L" or an inverted and reversed "L" shape.

Preferably, each of the optical signal coupling blocks may be a pipe block in which a plurality of optical signal coupling members are inserted into pipe shaped grooves defined by an under-cladding, a core and an over-cladding at regular intervals, and the core may be made of polymer and function as a guide without transmitting optical signals.

Preferably, the optical signal coupling members may be plastic optical fibers or optical waveguides, and may be cut at an angle of either 45° or 90° to be interconnected to the optical waveguides in an "L" or an inverted and reversed "L" shape.

Preferably, the optical signal coupling blocks may be bonded to walls of the optical via holes by ultraviolet or thermosetting epoxy when inserted into the optical via holes.

In addition, the present invention provides a method of coupling block type multichannel optical signals in a multi-layer Printed Circuit Board (PCB), comprising the steps of i) forming optical via holes of a number corresponding to that of optical signal coupling blocks to be inserted therein, in a multi-layer base board; ii) pre-forming fixing guides and attaching the fixing guides onto the multi-layer base board; iii) inserting one or more optical signal coupling blocks and an optical waveguide into each of layers of the multi-layer base board; and iv) aligning and interconnecting the optical signal coupling blocks and the optical waveguide so that the optical signal coupling blocks are interconnected to the optical waveguide via an optical signal in the layer.

Preferably, step ii) may further comprise the step of forming alignment targets on the fixing guides and attaching the fixing guides to the multi-layer base board with reference to the alignment targets.

Preferably, the method may further comprise v) forming a packaging frame enclosing a multi-layer base board for reducing the physical Stress when the multi-layer PCB is constructed in multiple layers; and vi) interconnecting the multi-layered structure formed by connecting said optical signal blocks and optical waveguides, to said packaging frame.

Preferably, the packaging frame may be made of low flow prepreg and an unclad CCL.

Preferably, the method may further comprise the step of placing a layer in which an electric circuit is formed, either to be closed so as to cover the packaging frame, or to be opened so as to uncover the packaging frame.

Preferably, the optical waveguides may be interconnected to the optical signal coupling blocks in such a way that the optical signal coupling blocks are interconnected to the optical waveguides from the shortest one.

In addition, the present invention provides a multi-layer PCB for coupling block type multichannel optical signals, comprising a) a plurality of base boards each having a plurality of optical via holes; b) a plurality of waveguides inserted into the base boards to transmit optical signals; c) a plurality of optical signal coupling blocks inserted into the optical via holes and interconnected; to the optical waveguides to transmit optical signals; and d) a plurality of fixing guides fired onto the base boards to guide the optical signal coupling blocks to be inserted into the via holes.

Preferably, the multi-layer PCB may further comprise alignment targets formed on the fixing guides and the base boards to function as alignment references for aligning the fixing guides and the base boards so as to fit the fixing guides onto the base boards.

Preferably, the multi-layer PCB may further comprise a packaging frame attached to enclose the base boards and the optical waveguides to reduce physical impact on the multi-layer PCB when the base boards and the optical waveguides are laid upon each other in multiple layers.

Preferably, the packaging frame may be made of low flow prepreg and an unclad CCL.

Preferably, the optical waveguides may be interconnected to the optical signal coupling blocks in such a way the optical signal coupling blocks are interconnected to the optical waveguides from the shortest one.

Preferably, the fixing guide may be made of a silicon board or polymer material.

Preferably, the fixing guide may be provided with windows that have sizes corresponding to those of the optical signal coupling blocks and are formed at positions corresponding to those of the optical via holes.

In accordance with the present invention, a plurality of optical via holes are formed in a multi-layer base board fiber or pipe blocks are simultaneously or sequentially inserted into the optical via holes through the use of fixing guides, and optical waveguides and optical fibers are interconnected to one another between layers, thereby forming N×N block type multichannel optical waveguides in multiple layers instead of conventional 1×N multichannel optical waveguides.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
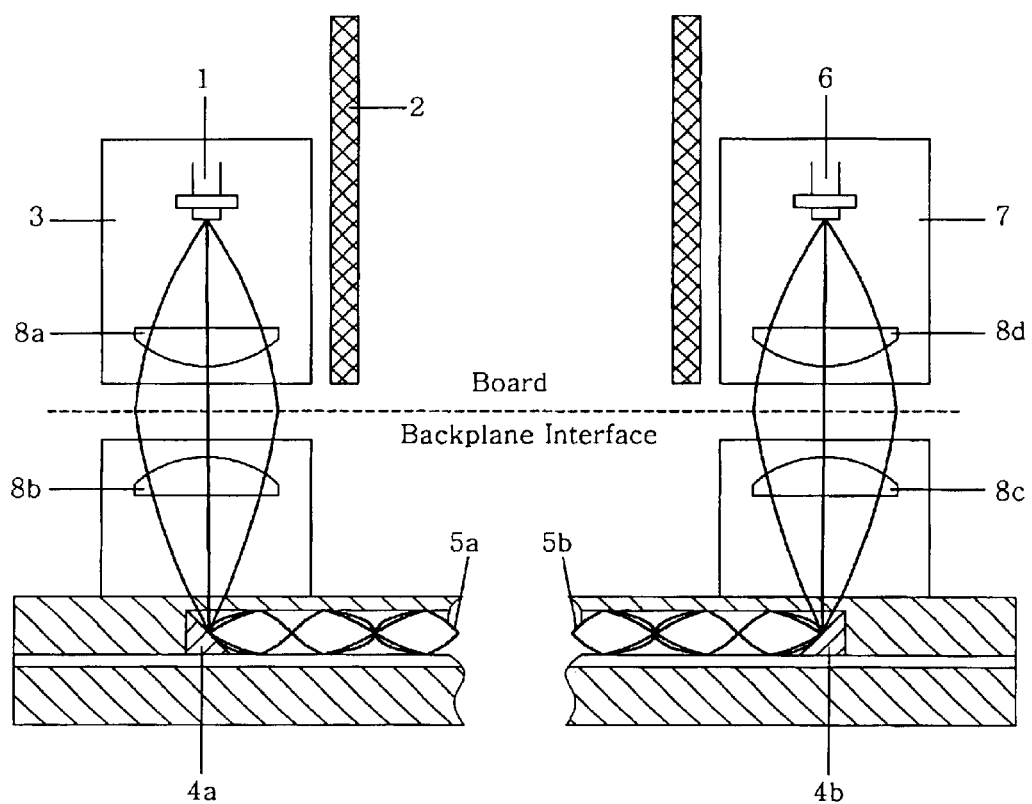
FIG. 1 is a view showing an example of an optical interface in the prior art.
Figure 2A:
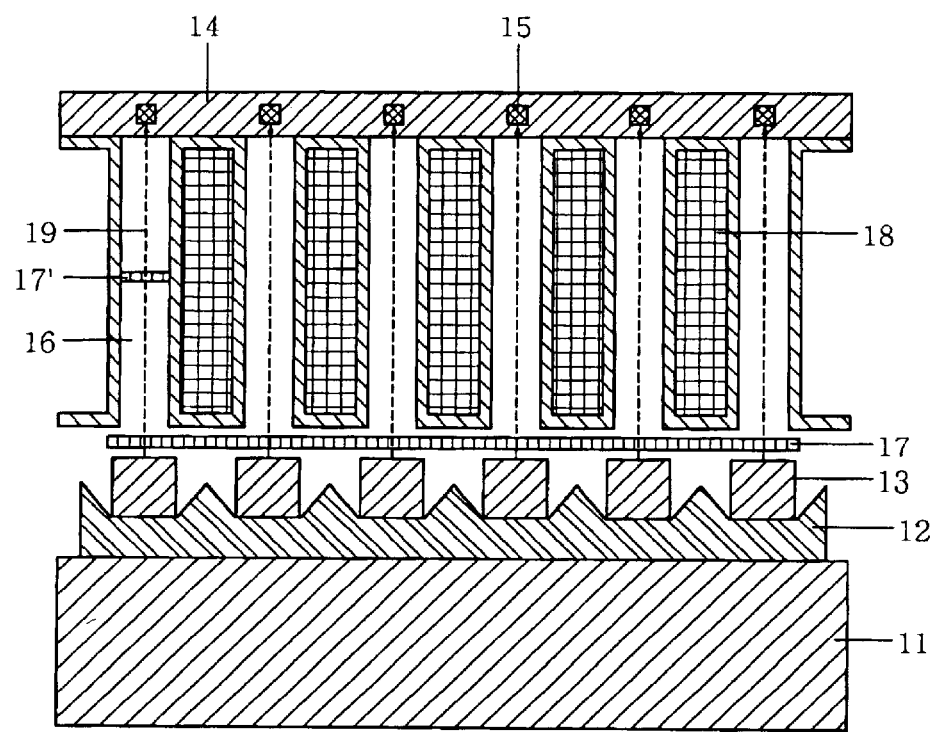
FIGS. 2a and 2b are front and side sectional views of a conventional multi-layer PCB for coupling optical signals with each other.
Figure 2B:
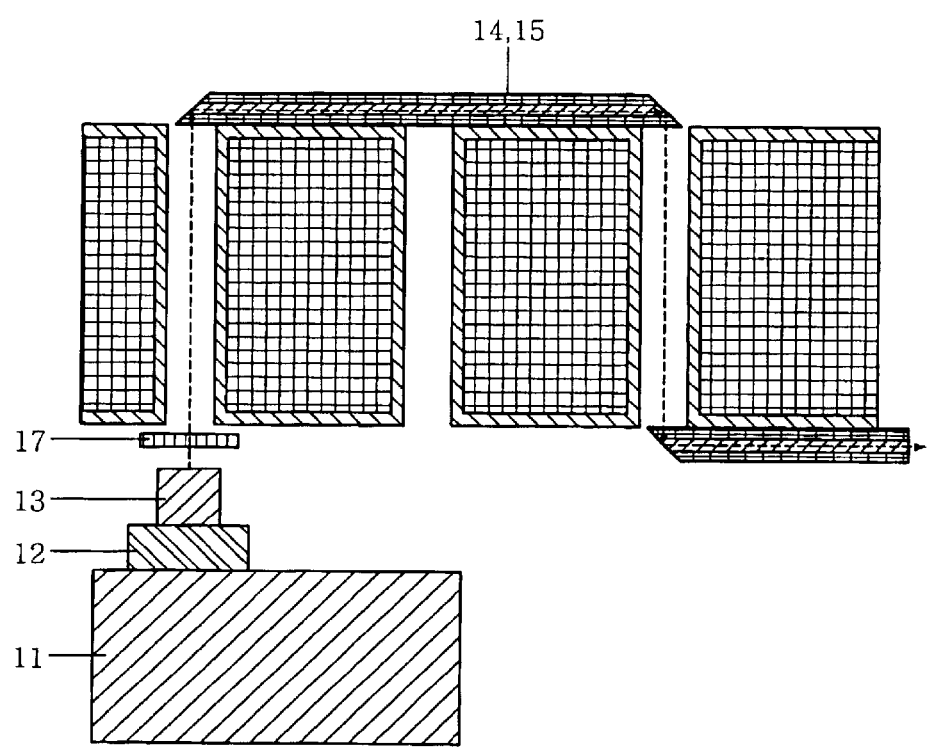

Reference now should be made to the drawings, in which the same reference numerals are used throughout the different drawings to designate the same or similar components.

A multi-layer PCB and method for coupling block type multichannel optical signals according to embodiments of the present invention is described with reference to the accompanying drawings.

First, a method for coupling optical signals between layers of the multi-layer PCB using optical signal coupling blocks according to the present invention is described.

Figure 3A:
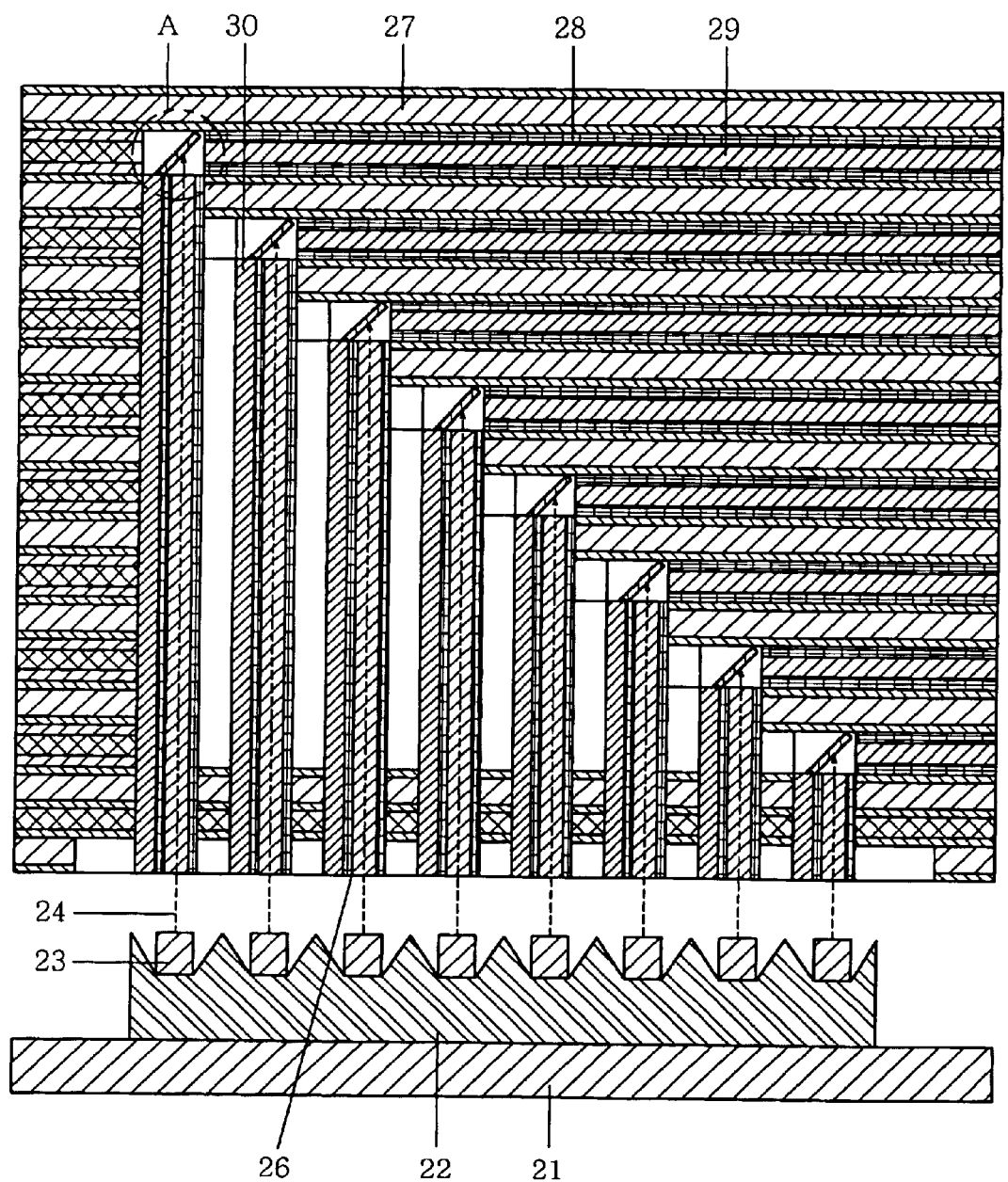
FIGS. 3a and 3b are front and side sectional views of a multi-layer PCB in which multi-channel optical signals of a multi-layer array type VCSEL are coupled together according to the present invention.
Figure 3B:
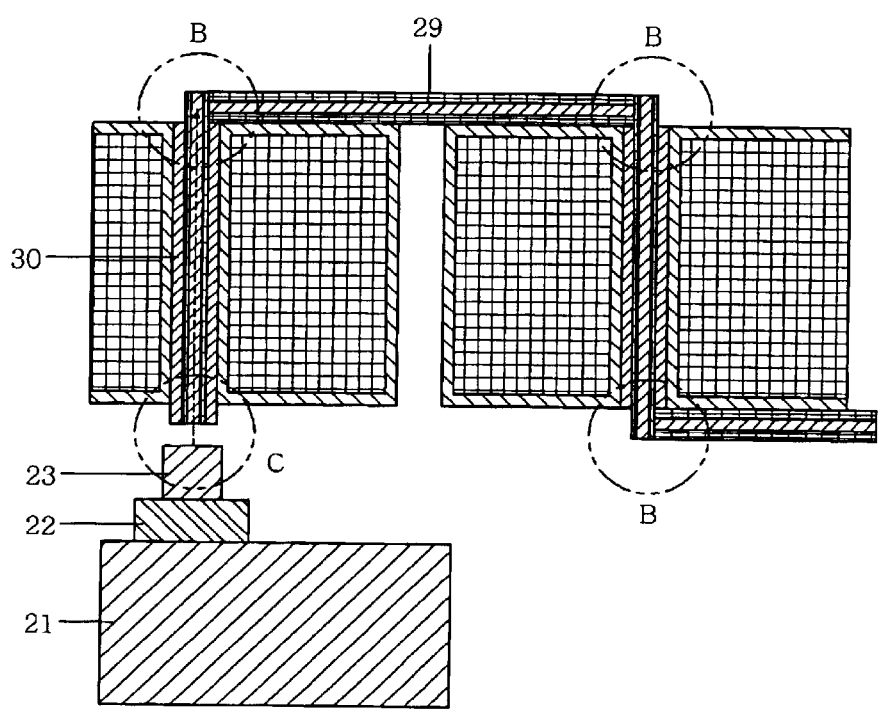

FIGS. 3a and 3b are front and side sectional views of a multi-layer PCB in which multi-channel optical signals of a multi-layer array type VCSEL are coupled together according to the present invention.

Referring to FIGS. 3a and 3b, the present invention employs a manner in which if light is emitted from VCSELs 23, that is, light sources, light is transmitted to optical waveguides 28 and 29 through the optical fibers 26 of fiber or pipe blocks 30 inserted into optical via holes. In this case, optical signal coupling between respective layers is also achieved in the same manner as described above. A SiOB 22 is formed on a PCB 21. The optical waveguides typically consist of a cladding 28 and a core 29, and allow light transmitted from the VCSELs 23 to be transferred along the optical fibers 26 in the fiber blocks or pipe blocks 30. Thereafter, the optical signals 24 are transferred to optical waveguides of other layers.

Additionally, in order to form N×N block type multichannel optical waveguides, a plurality of optical via holes are formed in a multi-layer base board. Then, a plurality of fiber blocks each having a plurality of "V" grooves or pipe blocks 30 are inserted into the via holes using fixing guides 25 simultaneously or sequentially and a plurality of optical waveguides 28 and 29 are interconnected to a plurality of optical fibers 26, thus interconnecting layers to each other in this case, the term "N×N block type multichannel" means that N channels are formed in N layers". Since N channels are conventionally formed in a single layer, the term "1×N block type multichannel" has been used.

Therefore, the optical via holes are formed in the PCB, the fiber or the pipe blocks 40 are inserted into the optical via holes utilizing the fixing guides, and the optical waveguides 28 and 29 are interconnected to the optical fibers 26 in respective layers, thus forming layers for coupling optical signals with each other in a built-up manner. Optical signals may be coupled by micro lenses "A" positioned between the optical waveguides and the fiber or pipe blocks 30.

FIG. 3b is a side cross-section of the multi-layer PCB of FIG. 3a. Optical signals are coupled together by connections illustrated in portions "B"s and "C". In this case, the portions "B" are portions in which the fiber or pipe blocks 30 are interconnected to the optical waveguides 29 by a beam reflection or direct writing coupling method. The portion "C" is a portion in which the fiber or pipe block 30 is inserted into a base board to transmit light radiated from the VCSEL 23.

Meanwhile, the fiber blocks of the present invention are described in detail with reference to FIGS. 4a to 4c, and the pipe blocks thereof are described in detail with reference to FIG. 5.

Figure 4A:
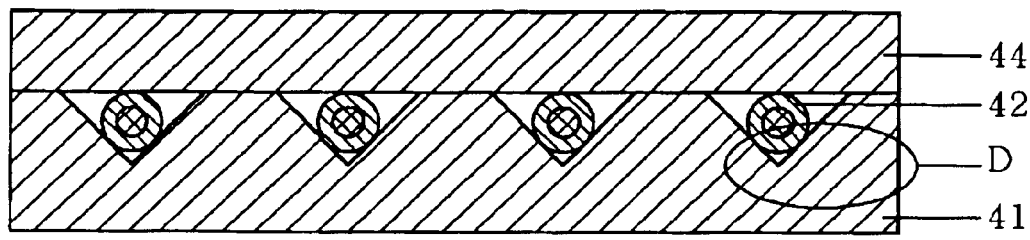
FIGS. 4a to 4c are cross-sections of various optical signal coupling fiber blocks each having "V" grooves.

FIG. 4a is a sectional view showing an optical signal coupling fiber block that has grooves of a certain shape in its lower portion but does not have grooves in its upper portion. FIG. 4b is a sectional view showing a fiber block having V-shaped grooves in only its lower portion. FIG. 4c is a sectional view showing a fiber block having V-shaped grooves in both its lower and upper portions. The certain shape is preferably a "V" shape.

Referring to FIG. 4a, when the optical signal coupling fiber block according to the embodiment is interconnected to the optical waveguide to couple optical signals between layers in the multi-layer PCB, the optical signal coupling fiber block can be constructed by comprising a lower block 41 provided with a plurality of V-shaped grooves formed therein at regular intervals, optic fibers 42 inserted into the V-shaped grooves, and an upper block 44 placed on the optical fibers 42.

The lower block 41 is made of a silicon wafer or polymer, and the V-shaped grooves "D" can be formed by laser ion etching.

Further, glass fibers can be used as the optical fibers 42, which are preferably plastic optical fibers (POFs). On the other hand, the optical fibers 42 can be replaced with optical waveguides, which will be described in detail.

The upper block 44 is made of Pyrax glass having a light transmissivity equal to or greater than 95%, or polymer.

Figure 4B:
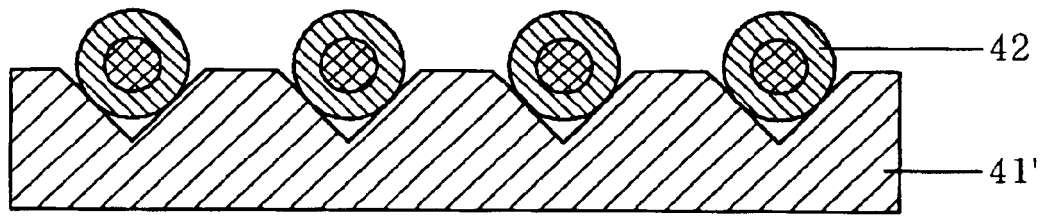
Figure 4C:
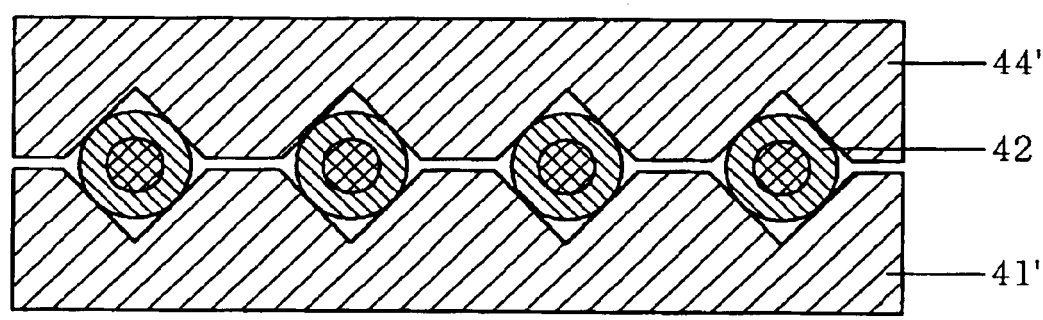

Further, referring to FIG. 4b, the fiber block can be formed using only a lower block 41' without an upper block shown in FIG. 4c.

Referring to FIG. 4c, an upper block 44' can be constructed such that grooves identical with the V-shaped grooves formed in the lower block 41' are formed therein.

Each of the optical fibers 42 is cut at an angle of either 45° or 90°, so it can be interconnected to the optical waveguide in an "L" or an inverted and reversed "L" shape.

Accordingly, in the fiber block of the present invention, the V-shaped grooves "D" are formed in the silicon (Si) wafer 41 to allow the optical fibers 42 to be inserted thereinto, so the fiber block functions as a medium for connecting the optical fibers 22 to the optical waveguide.

Figure 5:
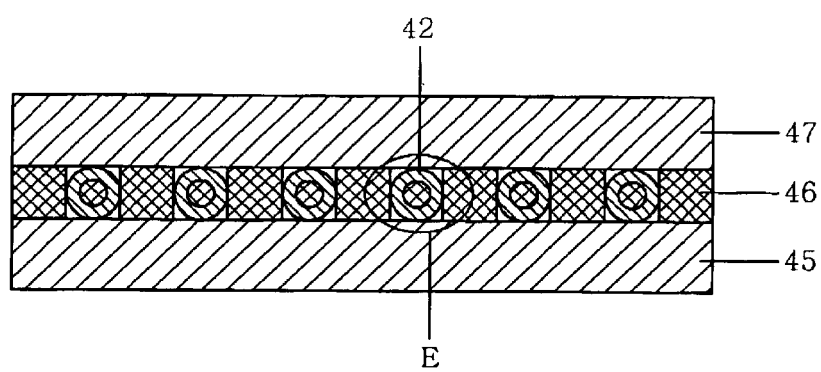
FIG. 5 is a cross-section of an optical signal coupling pipe block.

FIG. 5 is a sectional view of an optical signal coupling pipe block.

Referring to FIG. 5, the optical signal coupling pipe block of the present invention is constructed by comprising an under-cladding 45 made of a medium for an optical waveguide, a core 46 defining a plurality of grooves formed in the shape of a pipe "E" at regular intervals on the under-cladding 45, a plurality of optical fibers 42 inserted into the plural grooves, and an over-cladding 47 formed on the optical fibers 42.

The core 46 is formed of polymer, and only functions as a guide without the transmission of light. That is, the core 46 is not a medium for transmitting light, but a guide for supporting the optical fibers 42 so as to guide light transmission. The core 46, the under-cladding 45 and the over-cladding 47 are laid upon each other to form the plural pipes "E". The optical fibers 42 are inserted into the pipe block.

In this case, the plural grooves can be formed through a laser ion etching process.

Further, the optical fibers 42 can be glass fibers, and are preferably plastic optical fibers (POFs).

The over-cladding 47 is made of Pyrax glass having a light transmissivity equal to or greater than 95%, or polymer material.

Each of the optical fibers 42 is cut at an angle of either 45° or 90°, so it can he connected to the optical waveguide in an "L" or an inverted and reversed "L" shape.

That is, in the optical, signal coupling block of the present invention shown in FIGS. 4a to 4c and FIG. 5, "V" shaped grooves are formed in a polymer or Si wafer 41, with one end of each of the optical fibers 42 being cut at an angle of either 45° or 90° and with the other end thereof being cut at an angle of either 90° or 45°. Accordingly, the optical signal coupling fiber and pipe blocks are manufactured to be interconnected to the optical waveguide in an "L" or an inverted and reversed "L" shape, so they can be interconnected to allow different layers of the multi-layer PCB to freely exchange optical signals therebetween.

Hereinafter, multi-layer PCB and methods for coupling block type multichannel optical signals in accordance with embodiments of the present invention are described with reference to the accompanying drawings.

First Embodiment

A first embodiment of the present invention relates to a method of sequentially coupling block type multichannel optical signals in a multi-layer PCB.

Figure 6A:
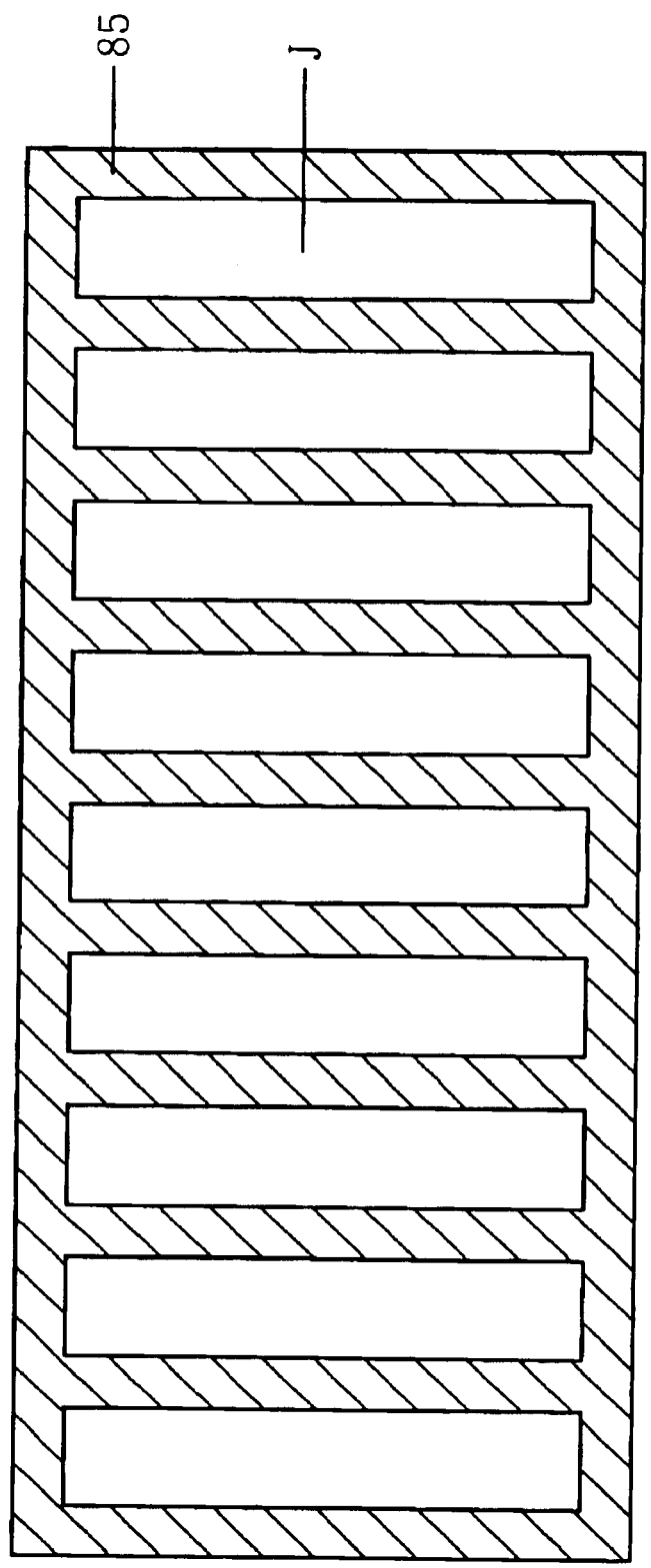
FIGS. 6a and 6b are plan views of a fixing guide and the fixing guide attached to a base board, respectively.
Figure 6B:
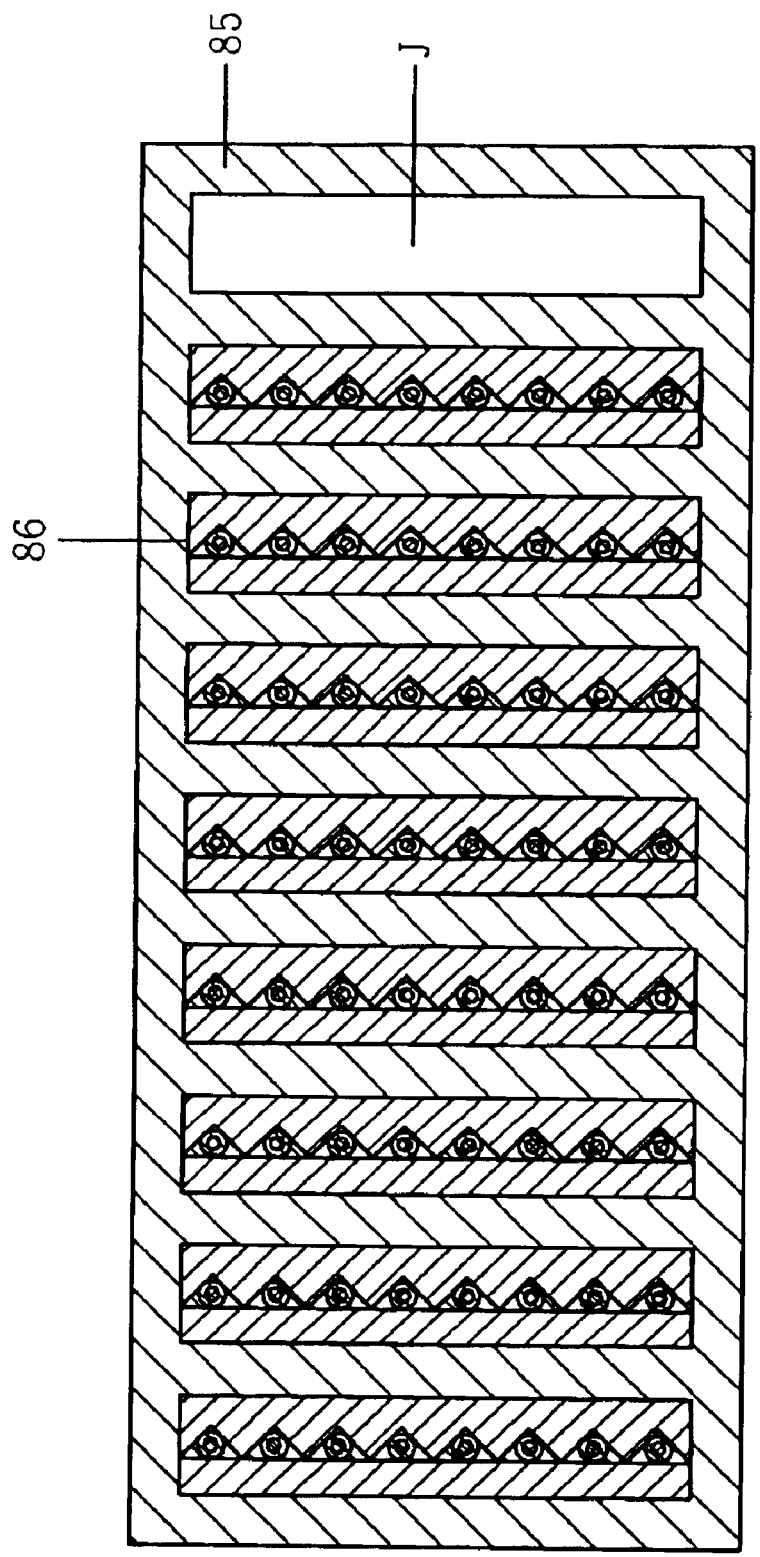

FIGS. 6a and 6b are plan views of a fixing guide and the fixing guide attached to a base board, respectively.

Referring to FIGS. 6a and 6b, windows J, which have sizes corresponding to those of optical signal connection blocks 86 to be inserted therein and are formed at positions corresponding to those of optical via holes, are formed in a fixing guide 85. In this case, the fixing guide 85 may be made of a silicon board or polymer material. Thereafter, optical fibers or optical waveguides are inserted into the optical signal coupling block 86.

FIGS. 7a to 7g are views showing a method of inserting optical waveguides and fiber or pipe blocks into a multi-layer base board according to a first embodiment of the present invention.

Figure 7A:
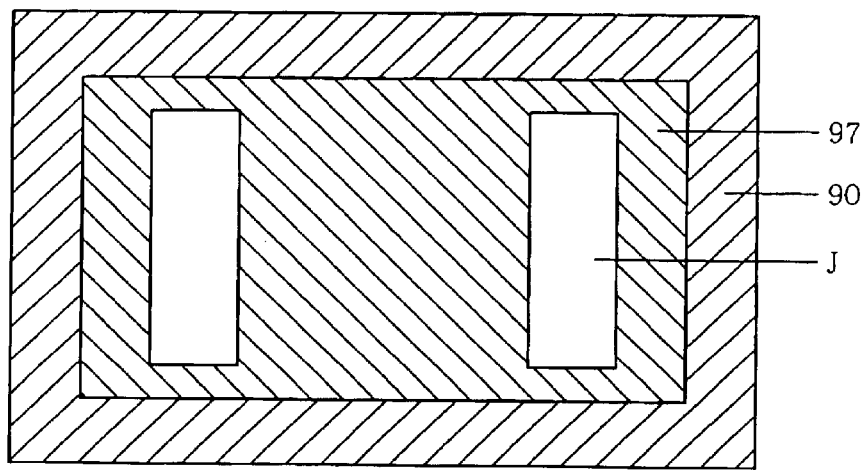
FIGS. 7a to 7g are views showing a method of inserting optical waveguides and fiber or pipe blocks into a multi-layer base board according to a first embodiment of the present invention.

FIG. 7a is a plan view showing a structure on which a fixing guide with windows formed therein is attached to a base board. Referring to FIG. 7a, a fixing guide 97, in which windows J are formed to allow optical signal coupling blocks to be inserted therein, are attached to printed circuit board 90. In this drawing, reference numeral 90 designates a printed circuit board including an inner insulating material and two copper films.

Figure 7B:
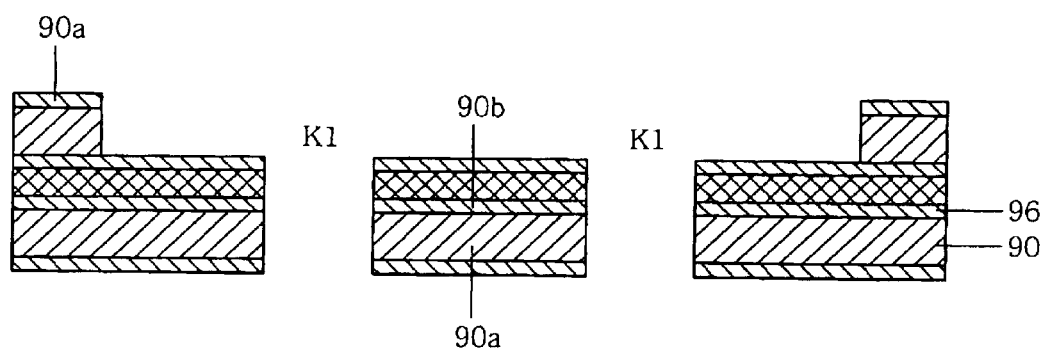
Figure 7C:
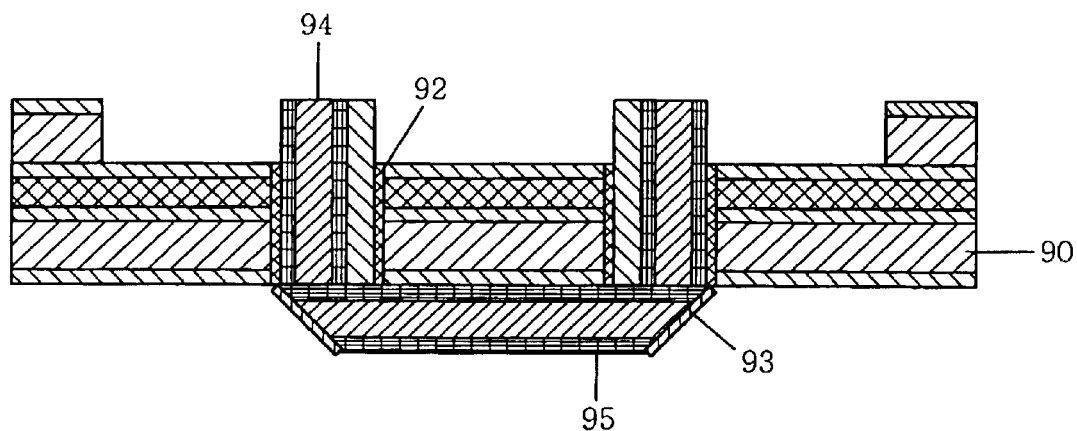
Figure 7D:
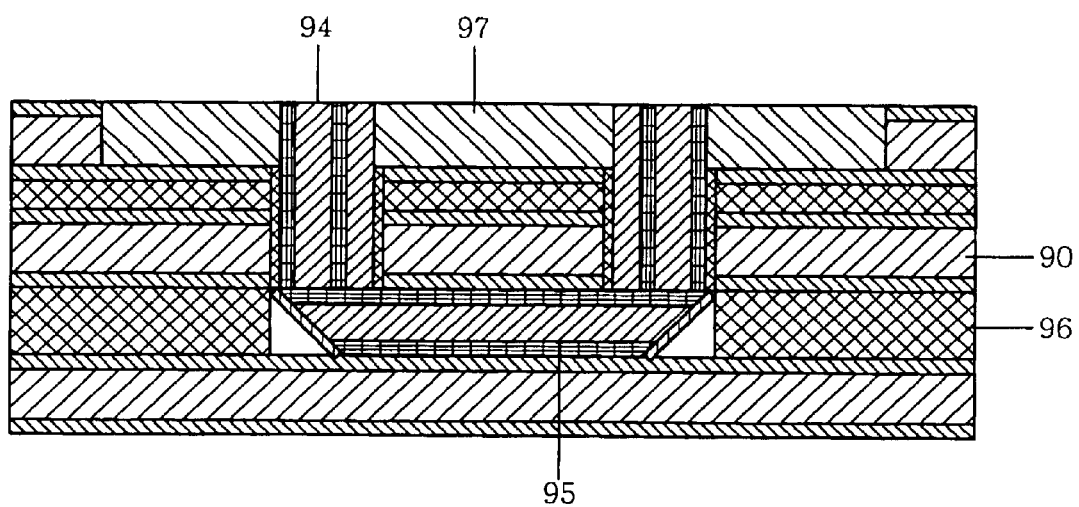

FIG. 7a is a plan view showing a structure that is formed by the steps illustrated in FIGS. 7b to 7d.

In order to connect multichannel optical signals in the multi-layer PCB, first optical via holes K1 are formed to allow optical signal coupling blocks to be inserted therein. In FIG. 7b, reference numeral 90a designates an inner insulating material of a Copper Clad Laminate (CCL), and reference numeral 90b designates two copper films formed in the upper and lower portions of the CCL. This drawing shows one CCL laid upon another CCL with an adhesive disposed therebetween.

Thereafter, optical signal coupling blocks 94 care inserted into each of the first optical via holes K1, and aligned to be connected to a corresponding optical waveguide 95 via an optical signal. When the optical signal coupling block 94 is inserted into the optical via hole K1, the optical signal coupling block 94 is bonded to the wall of the optical via hole K1 by ultraviolet or thermosetting epoxy 92. Reference numeral 93 designates a micro mirror attached to the optical waveguide 95 (refer to FIG. 7c).

Thereafter, the first fixing guide 97 is fitted onto the structure of FIG. 7c to fix the optical signal coupling blocks 94 (refer to FIG. 7d). Reference numeral 96 designates the adhesive used to bond the structure of FIG. 7c to a CCL, which may be low flow prepreg.

Figure 7E:
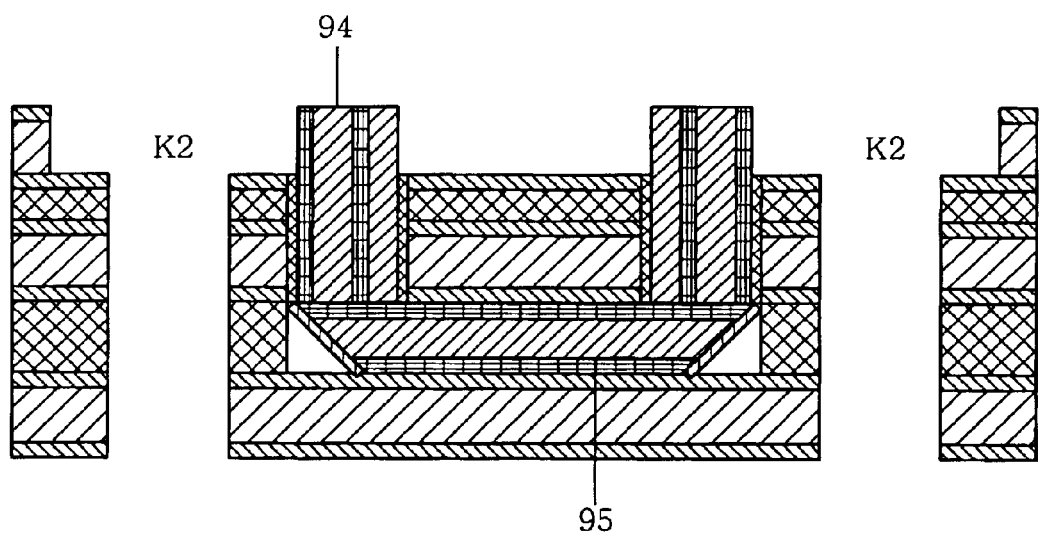

Thereafter, after the first fixing guide 97 is removed, second optical via holes K2 are formed through the structure of FIG. 7d to accommodate second optical signal coupling blocks 94b therein (refer to FIG. 7e).

Figure 7F:
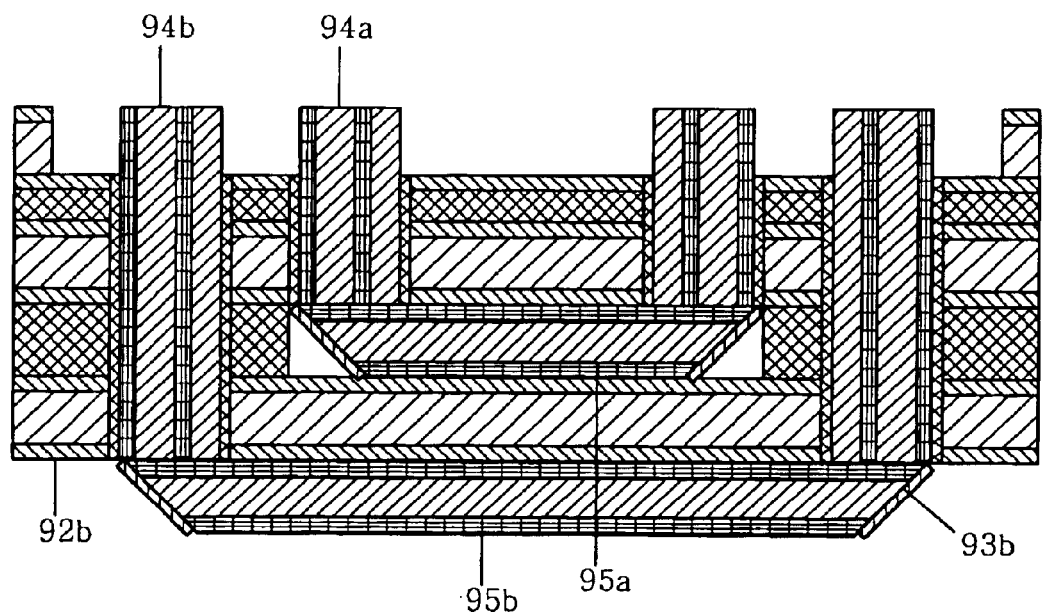

Thereafter, the steps illustrated in FIGS. 7b to 7e are repeatedly performed. In FIG. 7f, reference numeral 94a designates first optical signal coupling blocks, and reference numeral 94b designates second optical signal coupling blocks. Likewise, reference numeral 95a designates a first optical waveguide, reference numeral 95b designates a second optical waveguide, and reference numeral 97b in FIG. 7g designates a second fixing guide. Accordingly, the steps illustrated in FIGS. 7b to 7e are repeatedly performed to correspond to the number of layers of the multi-layer PCB, and a newly constructed layer is built up on a pre-constructed structure. The manufacture of the multi-layer PCB is completed while a last fixing guide is fitted onto a previously built-up structure. For example, when an eight-layer PCB is constructed, seven fixing guides are used, and first to sixth fixing guides used to form seven layers are removed after the performance of corresponding steps. However, a multi-layer PCB is manufactured while a seventh fixing guide is attached to the multi-layer base board. Such a fixing guide facilitates the coupling of the optical signal coupling blocks to the optical waveguide and the alignment of the layers of the multi-layer PCB. In this case, alignment targets are formed on the fixing guides and the layers of the multi-layer PCB so that the alignment of the layers of the multi-layer PCB is further facilitated.

As will be illustrated in the second embodiment, in order to reduce physical impact on the multi-layer PCB, a packaging frame is formed to enclose the body of the multi-layer PCB. The body of the multi-layer PCB with the optical signal coupling blocks and the optical waveguides interconnected to each other may be attached to the upper surface of the packaging frame 112 in FIG. 8e. In this case, the packaging frame can be pre-formed by manufacturing low flow prepreg and an unclad CCL into a desired shape.

Additionally, a layer on which an electric circuit is formed may either be opened to uncover the packaging frame, or closed t cover the packaging frame.

Second Embodiment

A second embodiment of the present invention relates to a multi-layer PCB and method for simultaneously coupling block type multichannel optical signals.

FIGS. 8a to 8g are views showing a method of inserting optical waveguides and fiber or pipe blocks in a multi-layer PCB according to a second embodiment of the present invention.

Figure 8A:
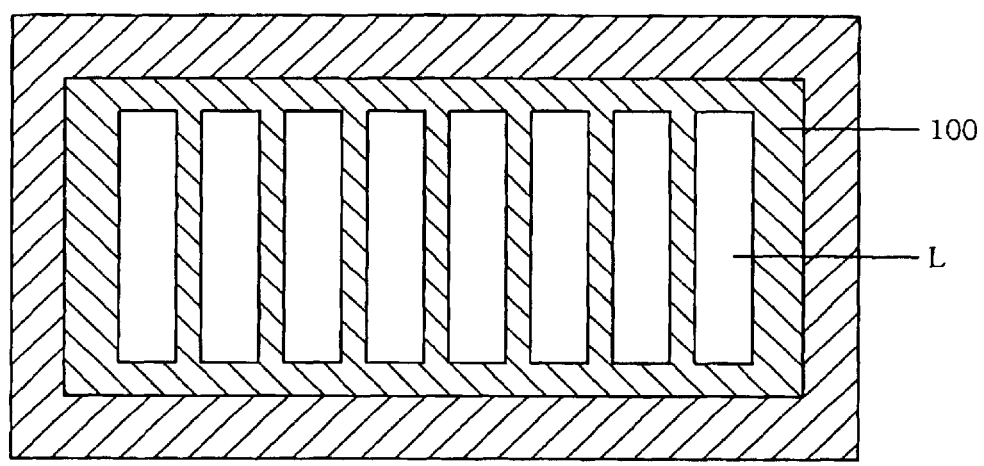
FIGS. 8a to 8g are views showing a method of inserting optical waveguides and fiber or pipe blocks in a multi-layer PCB according to a second embodiment of the present invention.

FIG. 8a is a plan view showing a structure in which a fixing guide with windows formed therein is attached to a base board. Referring to FIG. 8a, a fixing guide 100, in which a plurality of windows L are formed to allow optical signal coupling blocks to be inserted therein, is attached to a base board. In fact, FIG. 8a is a plan view showing a structure that has undergone the steps illustrated in FIGS. 8b to 8d.

Figure 8B:
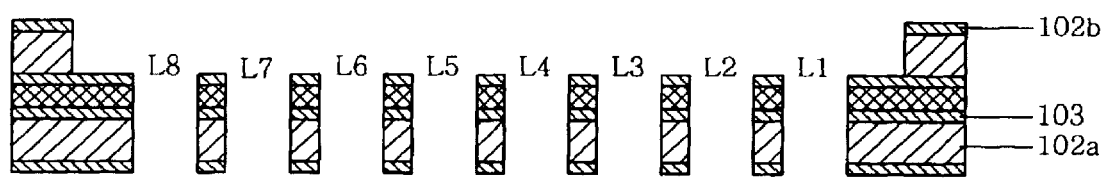

In order to implement the multi-layer PCB and method for coupling block type multichannel optical signals in accordance with the second embodiment of the present invention, a plurality of optical via holes L1 to L8 are formed to allow optical signal coupling blocks to be inserted therein (refer to FIG. 8b). In FIG. 8b, reference numeral 102a designates an inner insulating layer disposed in the middle of a CCL, and reference numeral 102b designates two copper films formed in the upper and lower portions of the CCL. Additionally, reference numeral 103 designates an epoxy adhesive that is used to bond two CCLs together.

Optical via holes L1 to L8 of a number corresponding to the number of optical signal coupling blocks to insert, are formed in a base board. After alignment targets are formed on a fixing guide 104 and the base board of FIG. 8b, the fixing guide 104 is attached to the base board of FIG. 8b (refer to FIG. 8c). The alignment targets are formed on the fixing guide 104 and the base board of FIG. 8b and align positions, thus preventing alignment errors. These alignment targets are the marks formed in advance on the fixing guide 104 and the PCB for alignment in the process of PCB layout, which are generally used in PCB manufacturing.

Thereafter, the optical signal coupling blocks and the optical waveguides are inserted into the corresponding layers of the multi-layer PCB. The optical signal coupling blocks and the optical waveguides are aligned and interconnected in each layer in order to couple the optical signals. Each of the optical signal coupling blocks 105 are interconnected to the optical waveguides 104 from the shortest one. In this case, differences in the length of the optical signal coupling blocks L1~L8 correspond to differences in the thickness of the optical waveguides. (refer to FIG. 8d).

Figure 8C:
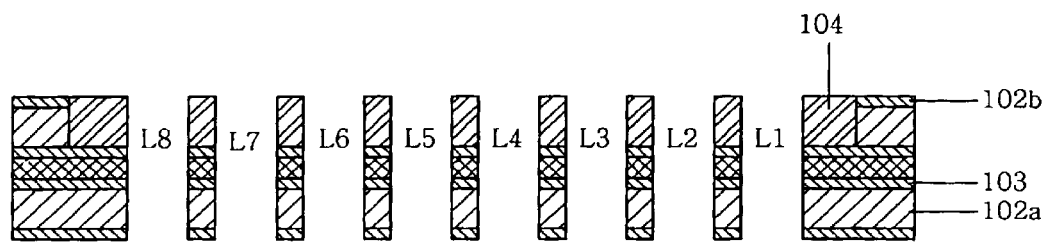
Figure 8D:
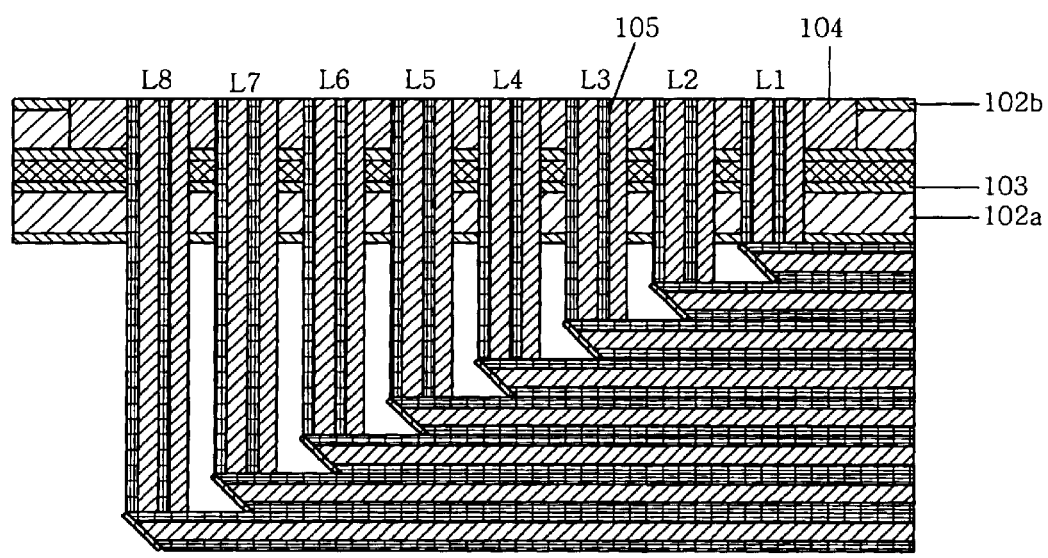
Figure 8E:
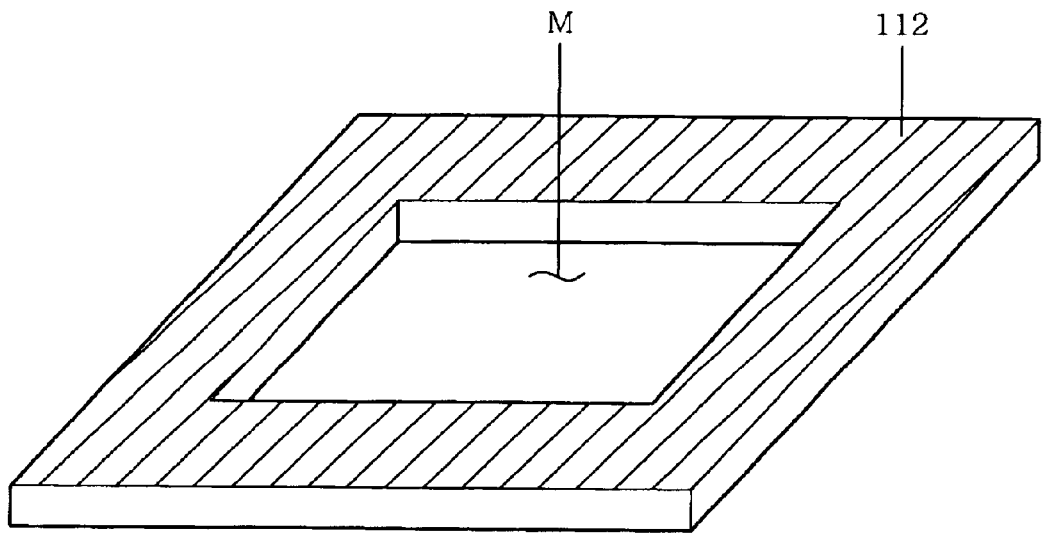
Figure 8F:
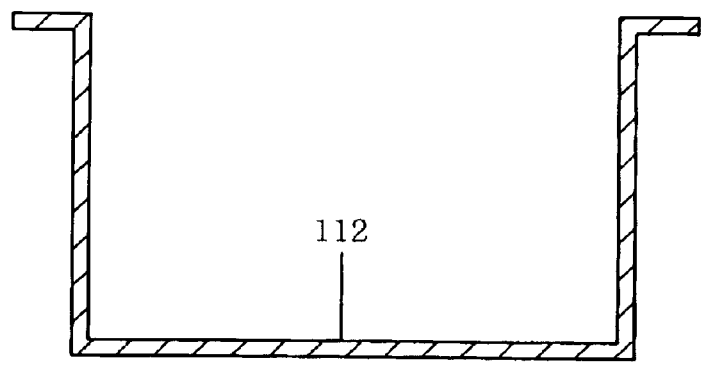

Thereafter, in order to reduce physical impact on the multi-layer PCB, a packaging frame is formed to enclose the body of the multi-layer PCB fabricated through the steps illustrated in FIGS. 8b to 8d. The body of the multi-layer PCB with the optical signal coupling blocks and the optical waveguides interconnected to each other may be attached to the upper surface of the packaging frame 112 in FIG. 8e. In this case, the packaging frame 112 may be pre-fabricated by manufacturing low flow prepreg and an unclad CCL into a desired shape using a mechanical drill (refer to FIGS. 8e and 8f).

Figure 8G:
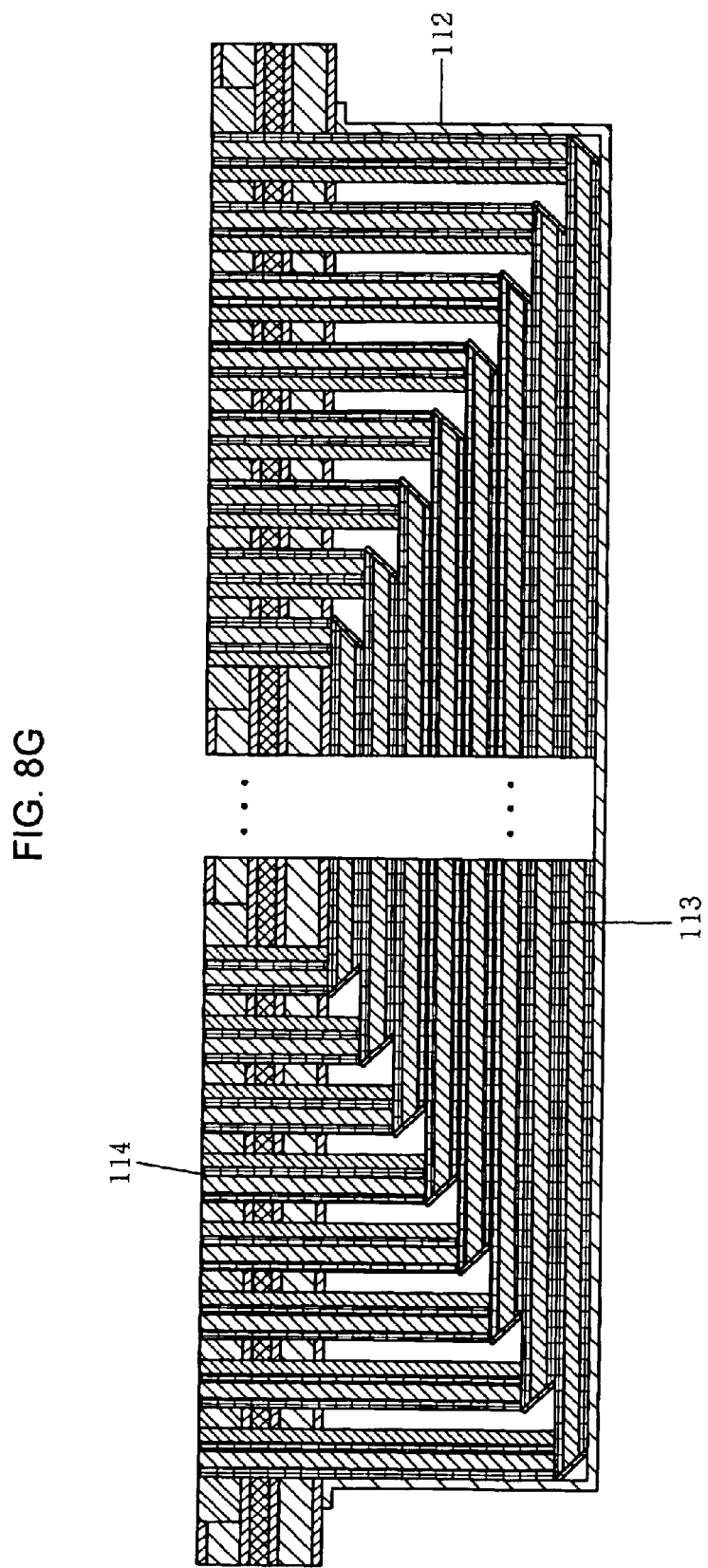

Finally, as shown in FIG. 8g, a multi-layer PCB is manufactured whose body is enclosed within the packaging frame 112 (refer to FIG. 8g).

Figure 7G:
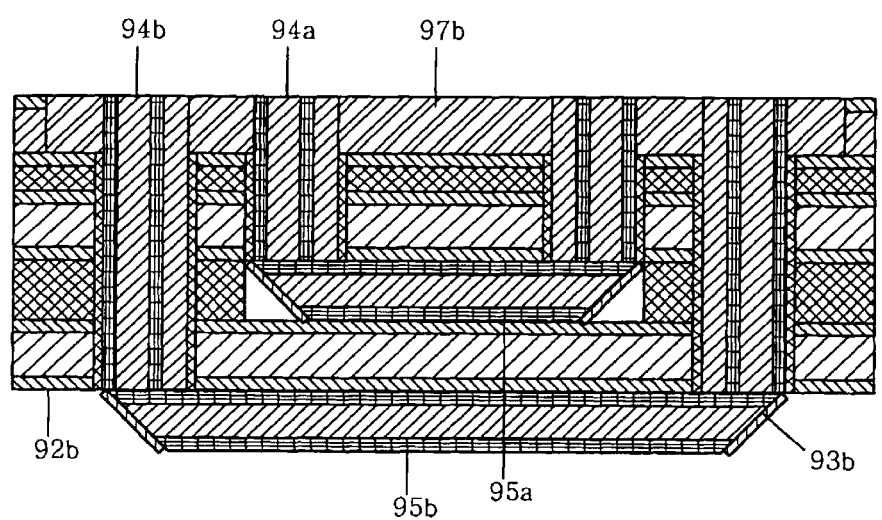
Figure 9A:
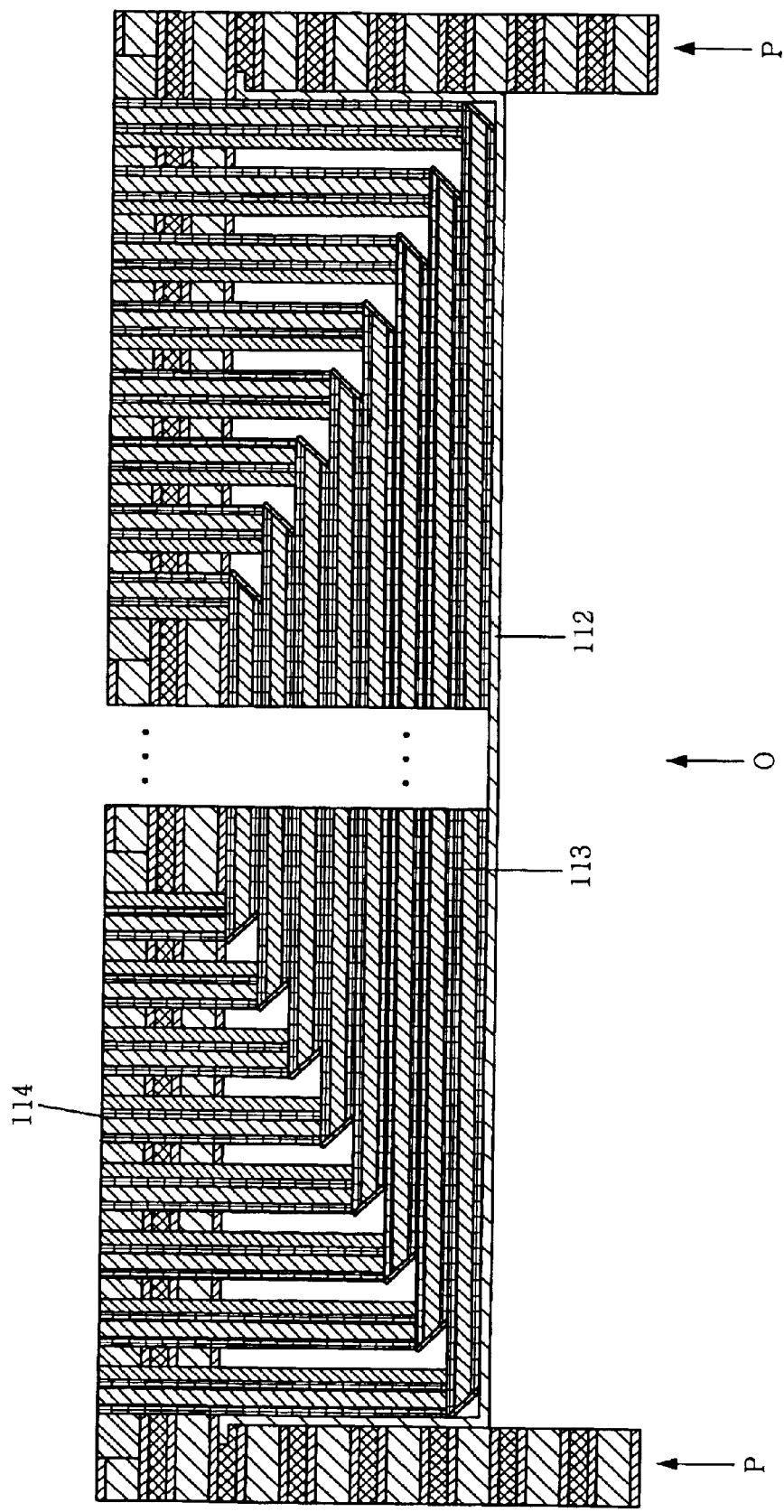
FIGS. 9a and 9b are cross-sections showing the forming of an electric circuit layer after FIGS. 7g and 8g, respectively.
Figure 9B:
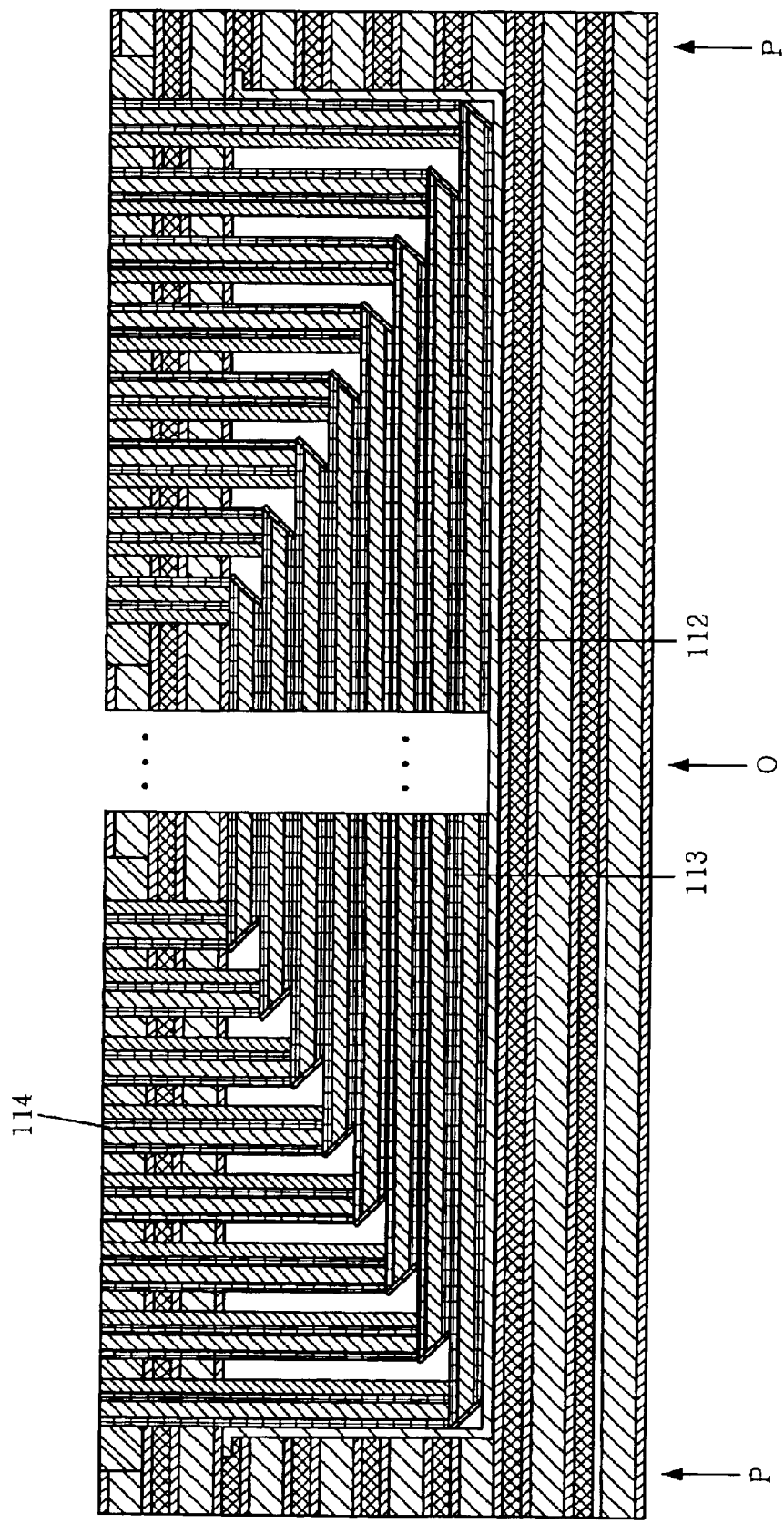

Meanwhile, FIGS. 9a and 9b are cross-sections showing the forming of an electric circuit layer after the packaging showing in FIGS. 7g and 8g, respectively. A layer in which an electric circuit is formed may be opened to uncover the packaging frame 112 (refer to FIG. 9a), or closed to cover the packaging frame 112 (refer to FIG. 9b). The lower part of the packaging frame 112 corresponds to the layer "O" where the optical signals are connected. On the both sides of the packaging frame 112, the electronic circuit layers "P" can be formed. When the multi-layer PCB is manufactured, the packaging frame 112 may be or not be covered with the electric circuit layer "P". In the case that the packaging frame 112 is covered with the electric circuit layers the deflection and stress generation of a multi-layer base body can be prevented.

As described above, the present invention provides a multi-layer PCB and method for coupling block type multichannel optical signals, which is capable of inserting dense optical waveguides into one or more layers of the multi-layer PCB, and improving alignment characteristics by preventing an alignment error using fixing guides.

Additionally, in accordance with the present invention, multichannel optical signals are interconnected across multiple layers, and broadband data can be simultaneously transmitted and received through the use of a single PCB by employing a N×N block type VCSEL array.

Additionally, in accordance with the present invention, after the waveguides are inserted in a PCB structure, the PCB structure equipped with the waveguides is packaged within the packaging frame, so physical stress can be prevented from being exerted on PCB structure in the process of manufacturing a multi-layer PCB.

Although first and second embodiments of the present invention have been disclosed for illustrative purposes, those skilled in the art will appreciate that various modifications additions and substitutions are possible, without departing from the scope and spirit of the invention as disclosed in the accompanying claims.

What is claimed is:

1. A method of coupling block type multichannel optical signals in a multi-layer Printed Circuit Board (PCB), comprising the steps of:
   i) forming one or more first optical via holes to allow one or more first optical signal coupling blocks to be inserted therein;
   ii) aligning a first optical waveguide and the first optical signal coupling blocks so that the first optical waveguide is interconnected to the first optical signal coupling blocks via an optical signal;
   iii) attaching a first fixing guide to a base board to fasten the first optical signal coupling blocks;
   iv) removing the first fixing guide and forming one or more second optical via holes to allow one or more second optical signal coupling blocks to be inserted therein; and
   v) repeatedly performing steps i) to iv) as many times as the number of layers of the multi-layer PCB;
   wherein the last fixing guide is attached to and maintained in the base board.

2. The method as set forth in claim 1, further comprising:
   vi) forming a packaging frame enclosing a multi-layer base board for reducing the physical stress when the multi-layer PCB is constructed in multiple layers; and
   vii) interconnecting the multi-layered structure formed by connecting said optical signal blocks and optical waveguides, to said packaging frame.

3. The method as set forth in claim 2, wherein the packaging frame is made of low flow prepreg and an unclad Copper Clad Laminate (CCL).

4. The method as set forth in claim 2, further comprising the step of placing a layer in which an electric circuit is formed, to be closed so as to cover the packaging frame.

5. The method as set forth in claim 2, further comprising the step of placing a layer in which an electric circuit is formed, to be opened so as to uncover the packaging frame.

6. The method as set forth in claim 1, wherein the fixing guide of step iii) is provided with windows that have sizes corresponding to those of the optical signal coupling blocks and are formed at positions corresponding to those of the optical via holes.

7. The method as set forth in claim 1, wherein the fixing guide of step iii) is made of a silicon board or polymer material.

8. The method as set forth in claim 1, wherein each of the optical signal coupling blocks of step i) is a fiber block in which a plurality of optical signal coupling members are inserted into a lower block provided with grooves each having a certain shape.

9. The method as set forth in claim 8, wherein the certain shape is a "V" shape.

10. The method as set forth in claim 8, wherein the grooves each having the certain shape are formed by laser ion etching.

11. The method as set forth in claim 8, wherein the optical signal coupling members are plastic optical fibers or optical waveguides.

12. The method as set forth in claim 8, wherein the optical signal coupling members are cut at an angle of either 45° or 90° to be interconnected to the optical waveguides in an "L" or an inverted and reversed "L" shape.

13. The method as set forth in claim 1, wherein each of the optical signal coupling blocks of step i) is a pipe block in which a plurality of optical signal coupling members are inserted into pipe shaped grooves defined by an under-cladding, a core and an over-cladding at regular intervals.

14. The method as set forth in claim 13, wherein the core is made of polymer, and functions as a guide without transmitting optical signals.

15. The method as set forth in claim 13, wherein the optical signal coupling members are plastic optical fibers or optical waveguides.

16. The method as set forth in claim 13, wherein the optical signal coupling members are cut at an angle of either 45° or 90° to be interconnected to the optical waveguides in an "L" or an inverted and reversed "L" shape.

17. The method as set forth in claim 1, wherein the optical signal coupling blocks are bonded to walls of the optical via holes by ultraviolet or thermosetting epoxy when inserted into the optical via holes.

18. A method of coupling block type multichannel optical signals in a multi-layer Printed Circuit Board (PCB), comprising the steps of:
   i) forming optical via holes of a number corresponding to that of optical signal coupling blocks to be inserted therein, in a multi-layer base board;
   ii) pre-forming fixing guides and attaching the fixing guides onto the multi-layer base board;
   iii) inserting one or more optical signal coupling blocks and an optical waveguide into each of layers of the multi-layer base board; and
   iv) aligning and interconnecting the optical signal coupling blocks and the optical waveguide so that the optical signal coupling blocks are interconnected to the optical waveguide via an optical signal in the layer.

19. The method as set forth in claim 18, wherein step ii) further comprises the step of forming alignment targets on the fixing guides and attaching the fixing guides to the multi-layer base board with reference to the alignment targets.

20. The method as set forth in claim 18, further comprising:
   v) forming a packaging frame enclosing a multi-layer base board for reducing the physical stress when the multi-layer PCB is constructed in multiple layers; and
   vi) interconnecting the multi-layered structure formed by connecting said optical signal blocks and optical waveguides, to said packaging frame.

21. The method as set forth in claim 20, wherein the packaging frame is made of low flow prepreg and an unclad CCL.

22. The method as set forth in claim 20, further comprising the step of placing a layer in which an electric circuit is formed, to be closed so as to cover the packaging frame.

23. The method as set forth in claim 20, further comprising the step of placing a layer in which an electric circuit is formed, to be opened so as to uncover the packaging frame.

24. The method as set forth in claim 20, wherein step vi) of interconnecting the optical signal coupling blocks to the optical waveguides is performed in such a way that the optical signal coupling blocks are interconnected to the optical waveguides from the shortest one.

25. The method as set forth in claim 18, wherein the fixing guide is made of a silicon board or polymer material.

26. The method as set forth in claim 18, wherein each of the optical signal coupling blocks of step i) is a fiber block in which a plurality of optical signal coupling members are inserted into a lower block provided with grooves each having a certain shape.

27. The method as set forth in claim 26, wherein the certain shape is a "V" shape.

28. The method as set forth in claim 26, wherein the grooves each having the certain shape are formed by laser ion etching.

29. The method as set forth in claim 26, wherein the optical signal coupling members are plastic optical fibers or optical waveguides.

30. The method as set forth in claim 18, wherein each of the optical signal coupling blocks of step i) is a pipe block in which a plurality of optical signal coupling members are inserted into pipe shaped grooves defined by an under-cladding, a core and an over-cladding at regular intervals.

31. The method as set forth in claim 30, wherein the optical signal coupling members are plastic optical fibers or optical waveguides.

32. A multi-layer PCB for coupling block type multichannel optical signals, comprising:
 a) a plurality of base boards each having a plurality of optical via holes;
 b) a plurality of waveguides inserted into the base boards to transmit optical signals;
 c) a plurality of optical signal coupling blocks inserted into the optical via holes and interconnected to the optical waveguides to transmit optical signals; and
 d) a plurality of fixing guides fitted onto the base boards to guide the optical signal coupling blocks to be inserted into the via holes.

33. The multi-layer PCB as set forth in claim 32, further comprising alignment targets formed on the fixing guides and the base boards to function as alignment references for aligning the fixing guides and the base boards so as to fit the fixing guides onto the base boards.

34. The multi-layer PCB as set forth in claim 32, further comprising a packaging frame attached to enclose the base boards and the optical waveguides to reduce physical impact on the multi-layer PCB when the base boards and the optical waveguides are laid upon each other in multiple layers.

35. The multi-layer PCB as set forth in claim 34, wherein the packaging frame is made of low flow prepreg and an unclad CCL.

36. The multi-layer PCB as set forth in claim 32, wherein the optical signal coupling blocks are interconnected to the optical waveguides from the shortest one.

37. The multilayer PCB as set forth in claim 32, wherein the fixing guide is made of a silicon board or polymer material.

38. The multi-layer PCB as set forth in claim 32, wherein the fixing guide is provided with windows that have sizes corresponding to those of the optical signal coupling blocks and are formed at positions corresponding to those of the optical via holes.

39. The multi-layer PCB as set forth in claim 32, wherein each of the optical signal coupling blocks is a fiber block in which a plurality of optical signal coupling members are inserted into a lower block provided with grooves each having a certain shape.

40. The multi-layer PCB as set forth in claim 39, wherein the certain shape is a "V" shape.

41. The multi-layer PCB in claim 39, wherein the grooves each having the certain shape are formed by laser ion etching.

42. The multi-layer PCB as set forth in claim 39, wherein the optical signal coupling members are plastic optical fibers optical waveguides.

43. The multi-layer PCB as set forth in claim 32, wherein each of the optical signal coupling blocks is a pipe block in which a plurality of optical signal coupling members are inserted into pipe shaped grooves defined by an under-cladding, a core and an over-cladding at regular intervals.

44. The multi-layer PCB as set forth in claim 43, wherein the optical signal coupling members are plastic optical fibers or optical waveguides.

* * * * *